US007121774B2

(12) United States Patent
Hirt et al.

(10) Patent No.: US 7,121,774 B2
(45) Date of Patent: Oct. 17, 2006

(54) CLAMPING DEVICE FOR HEXAGON BITS

(75) Inventors: Dieter Hirt, Winnenden (DE); Wilhelm Geis, Leutenbach (DE)

(73) Assignee: Atlas Copco Electric Tools GmbH, Winnenden (DE)

( * ) Notice: Subject to any disclaimer, the term of this patent is extended or adjusted under 35 U.S.C. 154(b) by 191 days.

(21) Appl. No.: 10/710,893

(22) Filed: Aug. 11, 2004

(65) Prior Publication Data

US 2005/0036844 A1 Feb. 17, 2005

(30) Foreign Application Priority Data

Aug. 14, 2003 (DE) ................................ 103 37 470

(51) Int. Cl.
*B23B 31/107* (2006.01)

(52) U.S. Cl. ........................................ 408/240; 279/75

(58) Field of Classification Search .................. 279/75, 279/22, 30, 74, 82; 408/240; *B23B 31/107*
See application file for complete search history.

(56) References Cited

U.S. PATENT DOCUMENTS

| | | | | |
|---|---|---|---|---|
| 4,629,375 | A | 12/1986 | Lieser | 408/239 R |
| 4,753,142 | A | 6/1988 | Hornung | 81/429 |
| 5,016,892 | A * | 5/1991 | Lafforgue et al. | 279/82 |
| 5,398,946 | A * | 3/1995 | Quiring | 279/30 |
| 5,954,347 | A * | 9/1999 | Buck et al. | 279/20 |
| 6,053,675 | A * | 4/2000 | Holland et al. | 408/239 R |
| 6,092,814 | A * | 7/2000 | Kageler | 279/19.4 |
| 6,241,026 | B1 * | 6/2001 | Wache et al. | 173/132 |
| 6,536,780 | B1 * | 3/2003 | Baumann et al. | 279/19.4 |
| 6,854,740 | B1 * | 2/2005 | Baumann et al. | 279/19.6 |
| 2003/0025281 | A1 | 2/2003 | Higasi et al. | 279/19.4 |

FOREIGN PATENT DOCUMENTS

| | | | |
|---|---|---|---|
| DE | 3536132 | A1 * | 4/1987 |
| DE | 202 11 170 | | 11/2002 |
| GB | 2322577 | A * | 9/1998 |
| WO | 03/018263 | | 3/2003 |

* cited by examiner

*Primary Examiner*—Daniel W. Howell
(74) *Attorney, Agent, or Firm*—Gudrun E. Huckett

(57) ABSTRACT

A clamping device has a hexagon receptacle for receiving hexagon bits inserted in an axial direction of the hexagon receptacle. A radially movable locking element is provided for engaging a locking recess of an inserted hexagon bit. The locking element has a rest position and projects in the rest position radially inwardly into the hexagon receptacle. A locking sleeve surrounds the hexagon receptacle in an initial position and has a cylindrical securing wall. The securing wall radially secures the locking element in the rest position. The locking element is axially moveable within the hexagon receptacle into a receiving position in which radial deflection of the locking element is enabled.

13 Claims, 2 Drawing Sheets

CLAMPING DEVICE FOR HEXAGON BITS

BACKGROUND OF INVENTION

1. Field of the Invention

The invention relates to a clamping device having a hexagon receptacle for hexagon bits. The clamping device comprises a radially movable locking element for engagement of a locking recess of the hexagon bit, wherein the locking element projects in a rest position radially inwardly into the hexagon receptacle.

2. Description of the Related Art

Many screw connections are carried out with mechanical or electro-mechanical assist devices, wherein mains-operated or battery pack-operated reversible drills, mechanical ratchet devices or the like are used. As a universally suitable tool, so-called hexagon bits have found great acceptance. These hexagon bits have a substantially hexagonal cross-section and are secured in matching hexagon receptacles, wherein the torque transmission from the hexagon receptacle onto the hexagon bit is realized by surface pressure acting on the lateral surfaces of the hexagon bit. For adaptation to different screwing tasks, an easy exchangeability of the hexagon bits is desirable. Corresponding snap-on connections enable, as needed, the use of bits for screws with slotted head or Philips head, socket bits or other hexagon bits that are adapted to the respective work situation. Hexagon bits having a quarter inch size are a widely accepted international standard.

In operation, securing of the bits in the axial direction was found to be a problem. Hexagon receptacles with integrated magnets are known wherein the magnet is designed to prevent, on the one hand, the inserted bit from accidentally falling out of the receptacle. On the other hand, the bit is to be magnetized in order to ensure adhesion of the screw on the bit. The holding force of the magnet however may not surpass a certain magnitude so that the inserted hexagon bit can be exchanged by hand without tools, for example, when it surpasses a wear limit. In particular, when having carried out a screwing action by applying high torque, it can occur that a hexagon bit remains stuck on the screw head and slips out of the hexagon receptacle when removing the screwing tool. Long bits or specialty bits have a higher weight, and the magnetic holding force can be too small for such bits.

Clamping with a hexagon receptacle are known in which the clamped hexagon bit is secured in the axial direction by means of appropriate locking elements by positive engagement. For this purpose, the hexagon bit has locking recesses, for example, in the form of a circumferential annular groove that is engaged by the locking element. For insertion and removal of such bits, a cumbersome release action is required.

SUMMARY OF INVENTION

It is an object of the present invention to provide a clamping device in which the hexagon bit is reliably secured and which allows easy exchange of the bit.

In accordance with the present invention, this is achieved in that the locking element in the rest position is secured with regard to its radial position by a cylindrical securing wall of a locking sleeve and, in the axial direction of insertion of the hexagon bit, is movable into a receiving position in which a radial deflection of the locking element is enabled.

Accordingly, a clamping device with a locking element is proposed, wherein the locking element in the rest position is secured with regard to its radial position and is movable in the axial insertion direction of the hexagon bit into a receiving position in which a radial deflection is enabled. In this connection, the locking element is in its rest position when no hexagon bit is inserted into the receptacle. For inserting the hexagon bit, the bit is pushed in the axial insertion direction into the receptacle until it strikes the locking element that projects radially inwardly into the hexagon receptacle in the rest position in which it is secured. Upon further pushing of the bit in the insertion direction, the locking element is moved in the axial insertion direction until it reaches its receiving position. In this receiving position, the locking element can be deflected in the radial direction so that the hexagon bit can be inserted completely into its hexagon receptacle. When inserting the bit, an automatic release action for the locking element is provided, and the locking element subsequently can be returned into its rest position for positively securing the hexagon bit in a captive way. The insertion of the bit requires only the insertion step. A separate release action for the locking element is not required.

The locking element is expediently designed such that it is axially movable against the force of a pressure spring that surrounds the hexagon receptacle. After deflection of the locking element into the release position, the locking element can subsequently return automatically into the locked rest position. A manual locking action is not required. A coil spring provided for the above described purpose that surrounds the hexagon receptacle requires only minimal space.

According to an advantageous embodiment, a stop plate is arranged between the locking element and the pressure spring. The stop plate has expediently a radial inwardly slanted portion in the area of the locking element. A precisely defined frictional connection between the pressure spring and the locking element can be obtained. The inwardly oriented slanted portion creates a radial inwardly oriented force component that assists snapping of the locking element into the locking recess of the hexagon bits. According to an advantageous embodiment, the slanted portion is in the shape of a spherical cap; this provides an excellent guiding action of the locking element that is embodied as a ball.

The hexagon receptacle has advantageously a slotted hole in which the locking element is guided in the axial direction. The slotted hole provides with simple means a guiding action of the locking element that is limited in the longitudinal direction of the hexagon receptacle and provides a fixed guide in the circumferential direction.

For a simple and reliable locking or release of the locking element in the radial direction it is advantageous to provide a locking sleeve having a securing wall. The securing wall secures the locking element in its rest position against a radial outwardly oriented movement and locks the locking element in this way. The resulting positive-locking action of the locking element results in a great securing force. The clamped and locked hexagon bit is held captively even under extreme conditions.

For an easy removability of a clamped hexagon bit, the locking sleeve is expediently designed such that it is movable from its initial position in the direction of a free end (receiving end) of the hexagon receptacle against the force of a pressure spring. For removing a clamped and locked bit, the locking sleeve must only be pulled in the same direction as the bit for its removal. When moving the locking sleeve, the locking element is released. The hexagon bit can be removed. The locking sleeve can be simply pulled by two of three fingers of one hand and, at the same time, the bit that is being released in this way can be removed with the same fingers in the same direction. The pressure spring causes an automatic return of the locking sleeve into its initial position so that the locking element is locked in its rest position. Cumbersome separate locking or release steps are not required.

According to an expedient embodiment, on the wall end of the securing wall opposite the free end of the clamping device when viewed in the axial direction, a radial outwardly extending slant is provided. Like the inwardly oriented slanted portion of the stop plate, the slant of the securing wall results in a radial inwardly oriented force component acting on the locking element. The locking element is forced reliably into the locking recess of the hexagon bit. In the axial direction, advantageously on the wall end of the securing wall facing the free end of the clamping device, a radial inwardly extending stop is provided. In this way, a precise relative position of the locking sleeve to the locking element is provided. The axial stroke required upon insertion of the bit for release of the locking element and also the axial release stroke of the locking sleeve for removal of the bit are precisely predetermined and can be adapted to the demands of the operator For reducing the manufacturing expenditure and for simplifying mounting, the locking sleeve is expediently embodied as a substantially rotational symmetrical rotary part. For an easy release action for removing a clamped bit, the locking sleeve advantageously is provided on its exterior with a surface profiling. The sleeve is easily actuatable even in the case of a soiled environment as well as when using protective gloves.

The locking element is advantageously configured as a ball. The relative movements between the ball, hexagon bit, stop plate, and locking sleeve can be essentially designed such that a rolling action is provided. In this way, only minimal wear will occur.

In the case of a clamping device integrated into the tool shaft of a machine tool, the locking sleeve expediently has an outer diameter that is smaller in comparison to the outer diameter of a drill chuck receptacle on the corresponding end of the tool shaft. When the drill chuck has such a configuration, it can be simply pushed across a mounted clamping device and can be secured on the drill chuck receptacle. Accordingly, retooling e.g. a reversible drill from screwing action to drilling action can be carried out without removal of the clamping device for hexagon bits. The clamping device is captively secured.

DETAILED DESCRIPTION

Figure 1:
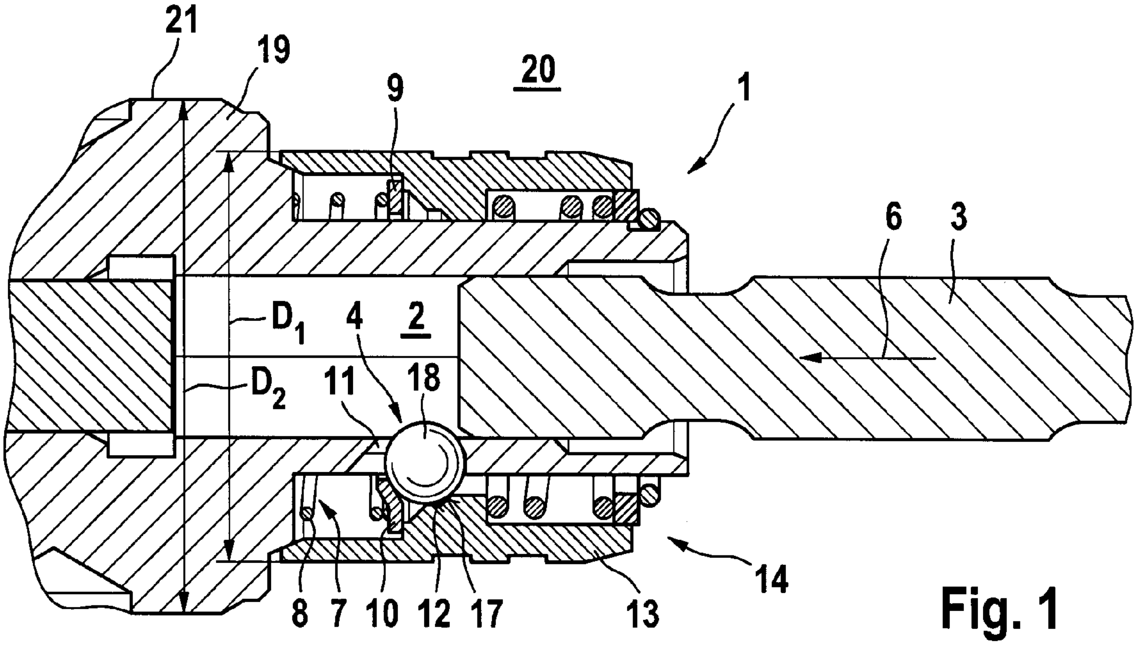
FIG. 1 is a longitudinal section view of a tool shaft of a reversible drill provided with a clamping device integrated into the end of the tool shaft; a partially inserted hexagon bit is shown.

FIG. 1 shows in longitudinal section the tool shaft 19 of a cordless (power pack-operated) reversible drill in the area of its end 20. The tool shaft can also be that of a mains-operated reversible drill or of any other hand-held machine tool. Into the end 20 of the tool shaft 19, a clamping device 1 for a hexagon bit 3 is integrated. The clamping device 1 comprises a hexagon receptacle 2 that is configured as a unitary (monolithic) part of the tool shaft 19. The hexagon receptacle 2, in the illustrated embodiment, has a cross-section of a symmetrical hexagon wherein the hexagon bit 3 that has a matching cross-section is insertable with minimal play into the receiving end of the receptacle in the axial insertion direction indicated by arrow 6. Instead of the hexagon cross-section of the hexagon receptacle 2, it is also possible to employ a suitable triangular cross-section or the like. It may also be expedient to employ instead of a receptacle for the clamping device 1 that is integrated into the tool shaft 19 a separate component as a clamping device 1, for example, for attachment in a three-jaw chuck, in a ratchet device or the like.

A locking element 4 is provided that is embodied as a ball 18 in the illustrated embodiment. It is also possible to employ a pawl-shaped locking element 4, a spring wire or the like. The looking element 4 is secured in a slotted hole 11 provided in the hexagon receptacle 2 and projects radial inwardly into the hexagon receptacle 2. The hexagon receptacle 2 is provided on its exterior with a locking sleeve 13 that extends approximately across the entire length of the receptacle 2. The locking sleeve 13 is configured as a rotary part having rotation symmetry. On its inner side, the locking sleeve 13 has a circumferentially extending cylindrical securing wall 12 that rests on the exterior of the locking element 4. The locking element 4 is illustrated in its rest position and secured by the securing wall 12 against movement in a radial outward direction.

By means of a pressure spring 7 that is embodied as a coil spring 8, a stop plate 9 is forced axially against the locking element 4 in the direction of the free end 14 of the clamping device 1. The stop plate 9 rests by means of a radial inwardly oriented slanted portion 10 against the locking element 4 so that the locking element 4 is pretensioned radially inwardly and axially in the direction of the free end 14. The slanted portion 10 can be embodied as a plane, as a spherical cup or the like. Because of the axial force component, the locking element 4 rests against an end of the slotted hole 11 facing the free end 14 and also against a stop 17 of the locking sleeve 13. The stop 17 extends radially inwardly on the wall end of the securing wall that faces the free end 14. In the rest position of the locking element 4 illustrated in FIG. 1, the hexagon bit 3 is insertable in the direction of arrow 6 until it strikes the locking element 4 that projects inwardly into the hexagon receptacle 2.

The locking element 4 is movable within the slotted hole 11 against the tensioning force of the pressure spring 7 in the direction of the arrow 6 in the axial direction of the receptacle 2.

In the area of the end 20 the tool shaft 19 has a drill chuck receptacle 21 on which, for example, a three-jaw chuck can be secured. The outer diameter $D_2$ of the chuck receptacle 21 is greater than the outer diameter $D_1$ of the locking sleeve 13.

Figure 2:
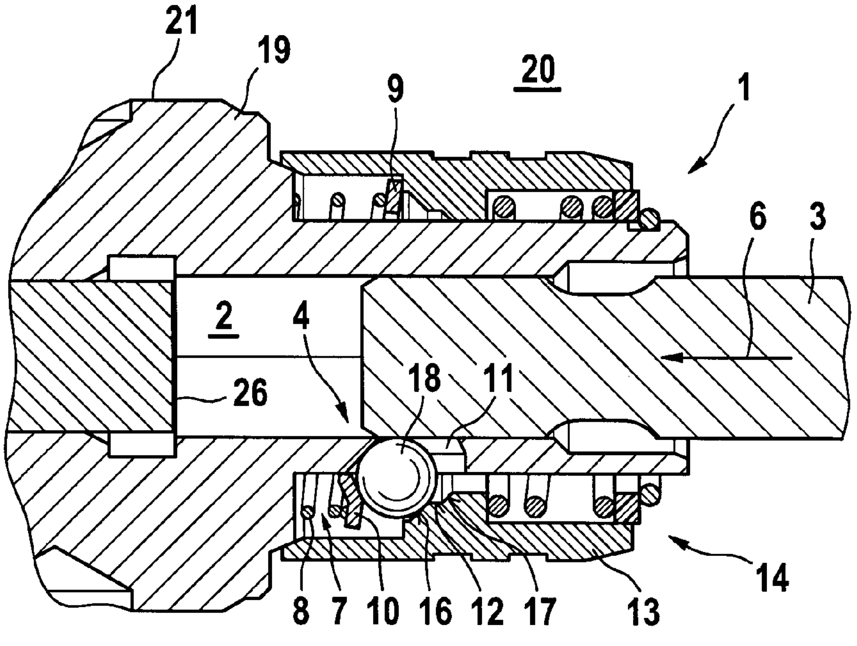
FIG. 2 shows the arrangement of FIG. 1 with the hexagon bit having been pushed farther inwardly so that it has pushed the locking element into the release position.

FIG. 2 shows the arrangement of FIG. 1 with the hexagon bit 3 having been inserted farther in comparison to the position of FIG. 1. The locking element 4 has been moved by the hexagon bit 3 axially in the direction of arrow 6 relative to the rest position illustrated in FIG. 1 and is now in the receiving (release) position. In the illustrated receiving position, the locking element 4 has been axially moved relative to the securing wall 12 such that the securing wall 12 is no longer positioned at the radially outwardly oriented side of the locking element 4. The locking element 4 has been moved radially outwardly in the illustrated receiving position that it no longer projects into the hexagon receptacle 2 and releases the passage (bore) of the receptacle 2. From the position illustrated in FIG. 2, the hexagon bit 3 can now be moved completely up to the stop 26, and the locking element 4 is forced by the force of the pressure spring 7 in the axial direction against the slant 16.

In the illustrated embodiment, one locking element 4 is provided; accordingly, the illustrated axial deflection has caused the stop plate 9 to be in a slanted position. The slanted portion 10 of the stop plate 9 is angled inwardly to such an extent that even for the slanted position of the stop plate 9, the slanted portion 10 exerts a radially inwardly acting force component onto the locking element 4 and prevents a complete movement of the locking element 4 in the outward direction. It is also possible to employ two or more locking elements 4.

Figure 3:
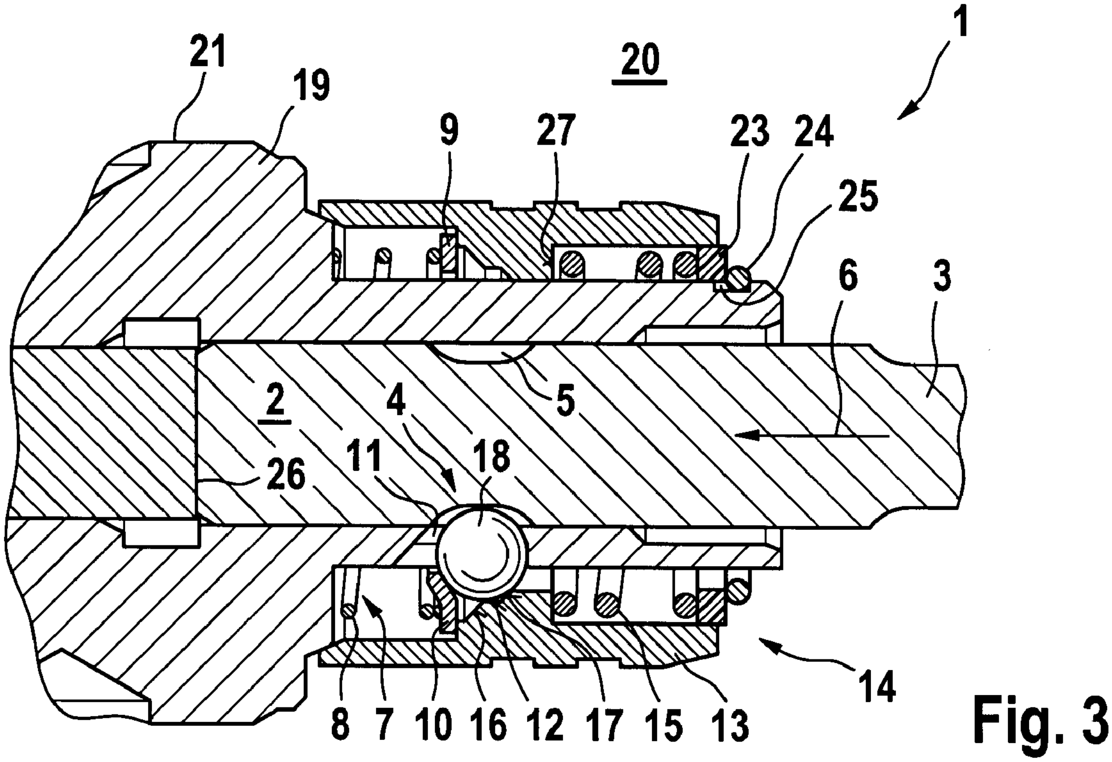
FIG. 3 shows the arrangement of FIGS. 1 and 2 with the hexagon bit snapped into place and locked.

FIG. 3 shows the arrangement according to FIGS. 1 and 2 where the hexagon bit 3 has been inserted to the point of striking the stop 26. The hexagon bit 3 has a locking recess 5 that, in the illustrated embodiment, is configured as a circumferential groove. It is possible to provide recesses having different configurations, for example, blind bores or the like. The slanted portion 10 of the stop plate 9 and the slant 16 of the locking sleeve 13 (FIG. 2) effect via the pressure force of the pressure spring 8 a radial inwardly oriented force component as a result of which the locking element 4 is forced into the locking recess 5. When the locking element 4 illustrated in FIG. 2 rolls or glides along the outer contour of the hexagon bit 3 into the locking recess, it is first radially inwardly moved by means of the stop plate 9 into the locking recess 5 and is subsequently moved in the axial direction into the rest position illustrated in FIG. 3. The securing wall 12 of the locking sleeve 13 positively surrounds the exterior of the locking element 4. The rest position illustrated in FIG. 3 of the locking element 4 corresponds to the rest position according to FIG. 1. By engaging the locking recess 5, the radially outwardly secured locking element 4 effects according to FIG. 3 a positive-locking and captive securing action of the hexagon bit 3 in the axial direction.

The locking sleeve 3 is slidingly guided in the axial direction on the exterior of the hexagon receptacle 2. In the area of the free end 14, at the inner side of the locking sleeve 13 a pressure spring 15 is arranged; it is supported with one end on the flange surface 27 of the locking sleeve 13 and with the opposed end on the stop ring 23. The stop ring 23 is supported in the axial direction by means of a spring ring 24 arranged in a circumferential groove 25. The locking sleeve 13 is slidingly movable against the force of the pressure spring 15 in the direction of the free end 14 and thus in the direction opposite to the arrow 6 that indicates the insertion direction.

Figure 4:
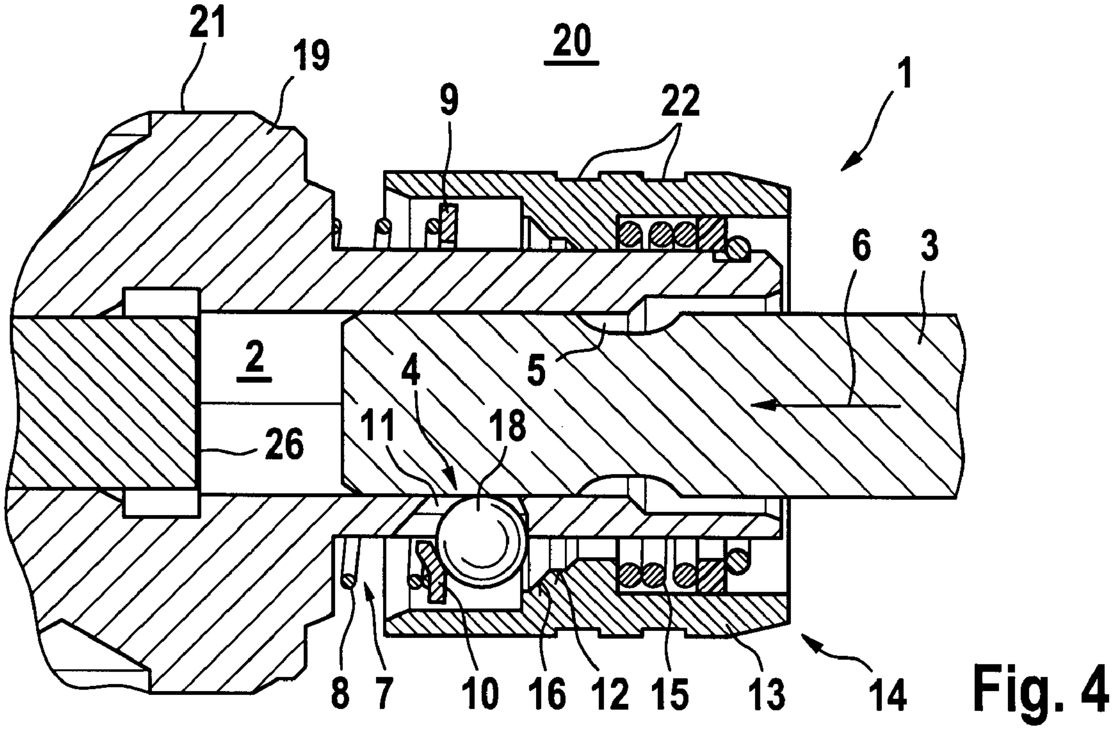
FIG. 4 shows the arrangement according to FIGS. 1 to 3 with forwardly pulled looking sleeve and partially removed hexagon bit.

For removal of the hexagon bit 3 from the clamping device 1, the locking sleeve 13 can be moved in accordance with FIG. 4 against the force of the pressure spring 15 in a direction counter to the insertion direction 6. Under the effect of the pressure force of the coil spring 8, the locking element 4 still rests against the end of the slotted hole 11 that is located at the side of the free end 14. The locking sleeve 13 is moved to such an extent counter to the insertion direction 6 that the securing wall 12 no longer surrounds the exterior side of the locking element. The locking element 4 is radially outwardly released and has moved so far outwardly that it no longer projects into the hexagon receptacle 2 or the locking recess 5. The hexagon bit 3 can be removed in a direction opposite to the insertion direction 6. The removal direction of the bit and the pulling direction of the locking sleeve 13 required for bit release coincide accordingly. Pulling the locking sleeve 13 from the position illustrated in FIG. 3 into the position of FIG. 4 and the removal in the same direction of the hexagon bit 3 can be carried out simultaneously and with one hand. For improving gripping of the locking sleeve 13, the sleeve 13 is provided on the exterior with a surface profiling that is formed by two circumferentially extending grooves 22 in the illustrated embodiment.

After release of the locking sleeve 13, it is automatically moved into the position illustrated in FIG. 1 under the action of the pressure spring 15, wherein, by means of the slant 16 and of the slanted portion 10 of the stop plate 9, the locking element 4 is forced radially inwardly into the position where it projects into the hexagon receptacle 2 and thus into the rest position of FIG. 1.

While specific embodiments of the invention have been shown and described in detail to illustrate the inventive principles, it will be understood that the invention may be embodied otherwise without departing from such principles.

What is claimed is:

1. A clamping device comprising:

- a hexagon receptacle adapted to receive hexagon bits inserted in an axial direction of the hexagon receptacle;
- a radially movable locking element adapted to engage a locking recess of a hexagon bit inserted into the hexagon receptacle;
- wherein the locking element has a rest position and projects in the rest position radially inwardly into the hexagon receptacle;
- a locking sleeve surrounding the hexagon receptacle in an initial position and having a cylindrical securing wall;
- wherein the securing wall radially secures the locking element in the rest position;
- wherein the locking element is moveable within the hexagon receptacle in the axial direction into a receiving position, wherein radial deflection of the locking element is enabled in the receiving position;
- a first pressure spring, wherein the locking element is axially moveable against a force of the first pressure spring; and
- a second pressure spring, wherein the locking sleeve is moveable from the initial position in the axial direction toward a receiving end of the hexagon receptacle against the force of the second pressure spring.

2. The clamping device according to claim 1, adapted to be provided as an integral part of a tool shaft of a hand-held machine tool.

3. The clamping device according to claim 1, wherein the first pressure spring surrounds the hexagon receptacle.

4. The clamping device according to claim 1, wherein the first pressure spring is a coil spring.

5. The clamping device according to claim 1, further comprising a stop plate arranged between the first pressure spring and the locking element.

6. The clamping device according to claim 5, wherein the stop plate has a slanted portion that is slanted radially inwardly, wherein the slanted portion rests against the locking element.

7. The clamping device according to claim 1, wherein the hexagon receptacle has a slotted hole and wherein the locking element is axially guided in the slotted hole.

8. The damping device according to claim 2, wherein the machine tool is a reversible drill.

9. The clamping device according to claim 1, wherein, in the axial direction, the securing wall has a wall end opposite the receiving end of the hexagon receptacle, wherein the wall end has a slant widening in a radial outward direction.

10. The clamping device according to claim 1, wherein, in the axial direction, the securing wall has a wall end facing the receiving end of the hexagon receptacle, wherein the wall end has a radially inwardly extending stop.

11. The clamping device according to claim 1, wherein the locking sleeve is a rotary part having substantially rotation symmetry.

12. The clamping device according to claim 1, wherein the locking sleeve has exterior surface profiling.

13. The clamping device according to claim 1, wherein the locking element is a ball.

* * * * *